3,358,031
SUBSTITUTED BENZYLIDENE
CYCLOHEXANEDIONES
Marvin L. Oftedahl, Crestwood, Mo., assignor to Monsanto Company, St. Louis, Mo., a corporation of Delaware
No Drawing. Filed Feb. 9, 1966, Ser. No. 526,051
9 Claims. (Cl. 260—590)

This invention relates to a novel class of substituted benzylidene cyclohexanediones. More particularly, this invention is concerned with a class of new organic compounds which are 2,2'-(halo, trifluoromethyl or nitro o-hydroxybenzylidene) bis(5,5-dimethyl-1,3-cyclohexanediones). Such compounds are found to possess useful and unexpected biological activity.

The novel compounds of this invention have the general formula

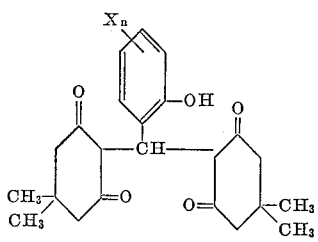

where X is selected from a group consisting of chlorine, bromine, $CF_3$, and $NO_2$, and $n$ is an integer from 1 to 3.

This class of compounds can be prepared by combining a substituted salicylaldehyde with 5,5-dimethyl-1,3-cyclohexanedione. The reactants are heated at reflux for about 5 minutes in 50% aqueous ethanol containing a small amount of piperidine. The reaction mixture is cooled, and the solid product is collected and recrystallized from aqueous ethanol or another suitable solvent.

A typical illustrative reaction for preparing a compound of this invention is shown in the following equation:

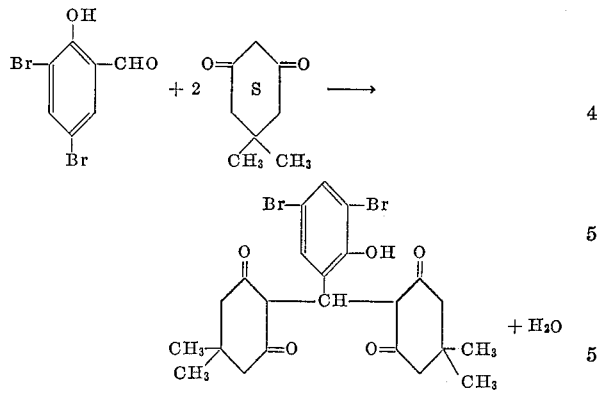

The invention will be more fully understood by reference to the following examples which are set forth herein solely for the purpose of illustration, and are not to be construed as limiting the scope of the present invention.

Example 1

A suitable reaction vessel is charged with 1.9 grams (0.01 mol) of 3,5-dichlorosalicylaldehyde, 2.8 grams (0.02 mol) of 5,5-dimethyl-1,3-cyclohexanedione, and 20 ml. of 50% aqueous ethanol containing one drop of piperidine. The reaction mixture is heated at reflux for 5 minutes, cooled, and the solid recovered by filtration. Recrystallization from aqueous ethanol yields the final purified product, which is identified as 2,2'-(3,5-dichloro-2-hydroxybenzylidene) bis(5,5 - dimethyl - 1,3 - cyclohexanedione); M.P. 229–230° C.; calculated for $C_{23}H_{26}Cl_2O_5$: Cl, 15.6; found: Cl, 15.9.

Example 2

Following the detailed procedure set forth in Example 1, the reactants employed are 3.3 grams (0.02 mol) of 3-nitrosalicylaldehyde and 5.6 grams (0.04 mol) of 5,5-dimethyl-1,3-cyclohexanedione. The product obtained is recrystallized from acetonitrile to yield 2,2'-(2-hydroxy-3-nitrobenzylidene) bis(5,5 - dimethyl - 1,3 - cyclohexanedione); M.P. 163–164° C.; calculated for $C_{23}H_{27}NO_7$: N, 3.26; found: N, 3.28.

Example 3

Following the detailed procedure set forth in Example 1, the reactants employed are 2.25 grams (0.01 mol) of 3,4,5-trichlorosalicylaldehyde and 2.8 grams (0.02 mol) 5,5-dimethyl-1,3-cyclohexanedione. The product obtained is 2,2'-(2-hydroxy-3,4,5-trichlorobenzylidene) bis(5,5-dimethyl-1,3-cyclohexanedione).

Example 4

Following the detailed procedure set forth in Example 1, the reactants employed are 3.3 grams (0.02 mol) of 5-nitrosalicylaldehyde and 5.6 grams (0.04 mol) of 5,5-dimethyl-1,3-cyclohexanedione. The product obtained is 2,2'-(2-hydroxy-5-nitrobenzylidene) bis(5,5-dimethyl-1,3-cyclohexanedione).

Example 5

Following the detailed procedure set forth in Example 1, the reactants employed are 4.0 grams (0.02 mol) of 5-bromosalicylaldehyde and 5.6 grams (0.04 mol) of 5,5-dimethyl-1,3-cyclohexanedione. The product obtained is 2,2' - (2 - hydroxy - 5 - bromobenzylidene) bis(5,5 - dimethyl-1,3-cyclohexanedione).

Example 6

Following the detailed procedure set forth in Example 1, the reactants employed are 3.1 grams (0.02 mol) of 5-chlorosalicylaldehyde and 5.6 grams (0.04 mol) of 5,5-dimethyl-1,3-cyclohexanedione. The product obtained is 2,2' - (5 - chloro - 2 - hydroxybenzylidene) bis(5,5 - dimethyl-1,3-cyclohexanedione).

The products of the present invention are adapted for use in the control of microbiological organisms. In a representative test, 2,2'-(3,5-dichloro-2-hydroxybenzylidene) bis(5,5-dimethyl-1,3-cyclohexanedione) is found to control the growth of Staphylococcus aureus at a dilution in excess of one part per million. In the same test 2,2'-(5-chloro-2-hydroxybenzylidene) bis(5,5-dimethyl-1,3-cyclohexanedione) is found to control the growth of the same organism at a dilution in excess of one part per one hundred thousand. In addition, 2,2'-(2-hydroxy-3-nitrobenzylidene) bis(5,5-dimethyl-1,3-cyclohexanedione) is found to control the growth of Salmonella typhosa at a dilution in excess of one part per ten thousand. Similar activity with these and other organisms is displayed by other and different benzylidene cyclohexanediones of this invention. As opposed to this, the parent compound 2,2'-(o-hydroxybenzylidene) bis(5,5-dimethyl-1,3-cyclohexanedione) was completely ineffective in controlling the growth of the above bacteria at concentrations at least ten times greater than those noted for the substituted compounds of this invention.

While the invention has been described herein by means of several specific examples, it is not so limited. It is to be understood that modifications and variations of the invention, obvious to those skilled in the art, may be made without departing from the spirit and scope of said invention.

The embodiments of the invention in which an exclusive property or privilege is claimed are defined as follows:

1. A compound of the formula

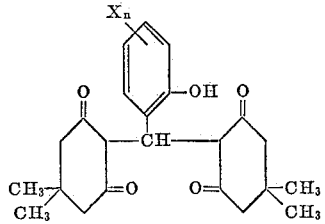

where X is selected from the group consisting of chlorine, bromine, $CF_3$, and $NO_2$, and $n$ is an integer from 1 to 3.

2. A compound as defined in claim 1 wherein X is chlorine.

3. A compound as defined in claim 1 wherein X is bromine.

4. A compound as defined in claim 1 wherein X is $NO_2$.

5. A compound as defined in claim 1 wherein X is $CF_3$.

6. A compound as defined in claim 1 wherein the compound is 2,2'-(3,5-dichloro-2-hydroxybenzylidene) bis(5,5-dimethyl-1,3-cyclohexanedione).

7. A compound as defined in claim 1 wherein the compound is 2,2'-(5-chloro-2-hydroxybenzylidene) bis(5,5-dimethyl-1,3-cyclohexanedione).

8. A compound as defined in claim 1 wherein the compound is 2,2'-(2-hydroxy-3-nitrobenzylidene) bis(5,5-dimethyl-1,3-cyclohexanedione).

9. A compound as defined in claim 1 wherein the compound is 3,3'-(5-bromo-2-hydroxybenzylidene) bis(5,5-dimethyl-1,3-cyclohexanedione).

References Cited
FOREIGN PATENTS 1,090,729   4/1955   France.

DANIEL D. HORWITZ, *Primary Examiner.*